United States Patent [19]

Schwenk

[11] 3,951,225

[45] Apr. 20, 1976

[54] TORSION AXLE FOR MOTOR VEHICLES

[76] Inventor: Kurt Schwenk, Rontgenstr. 56, 318 Wolfsburg, Germany

[22] Filed: Oct. 12, 1972

[21] Appl. No.: 298,552

Related U.S. Application Data

[63] Continuation of Ser. No. 96,794, Dec. 10, 1970, abandoned.

[30] Foreign Application Priority Data

Dec. 12, 1969 Germany............................ 1962276

[52] U.S. Cl................................ 180/73 R; 280/700
[51] Int. Cl.².......................................... B60G 11/50
[58] Field of Search .............. 280/124 B; 180/73 R; 267/25, 11 R

[56] References Cited
UNITED STATES PATENTS

| | | | |
|---|---|---|---|
| 2,083,085 | 6/1937 | Palmer | 180/73 R |
| 2,689,015 | 9/1954 | Nallinger | 280/124 X |
| 2,692,770 | 10/1954 | Nallinger et al. | 267/11 R X |
| 3,071,366 | 1/1963 | Loehr | 280/124 B X |
| 3,150,869 | 9/1964 | Birney | 280/124 B X |
| 3,159,390 | 12/1964 | Stiglich | 280/124 B X |

Primary Examiner—M. Henson Wood, Jr.
Assistant Examiner—Terrance L. Siemens
Attorney, Agent, or Firm—Watson, Cole, Grindle & Watson

[57] ABSTRACT

A torsion axle for vehicles, such as motor vehicles, having longitudinal arms, a transversely directed torsionally elastic axle element connecting the longitudinal arms, and carrier elements welded to the ends of the transverse axle element, the cross-section of the transverse axle element being shaped to retain, upon twisting, an at least approximately planar shape at the front sides thereof for better connection of the carrier elements to the transverse axle element.

4 Claims, 2 Drawing Figures

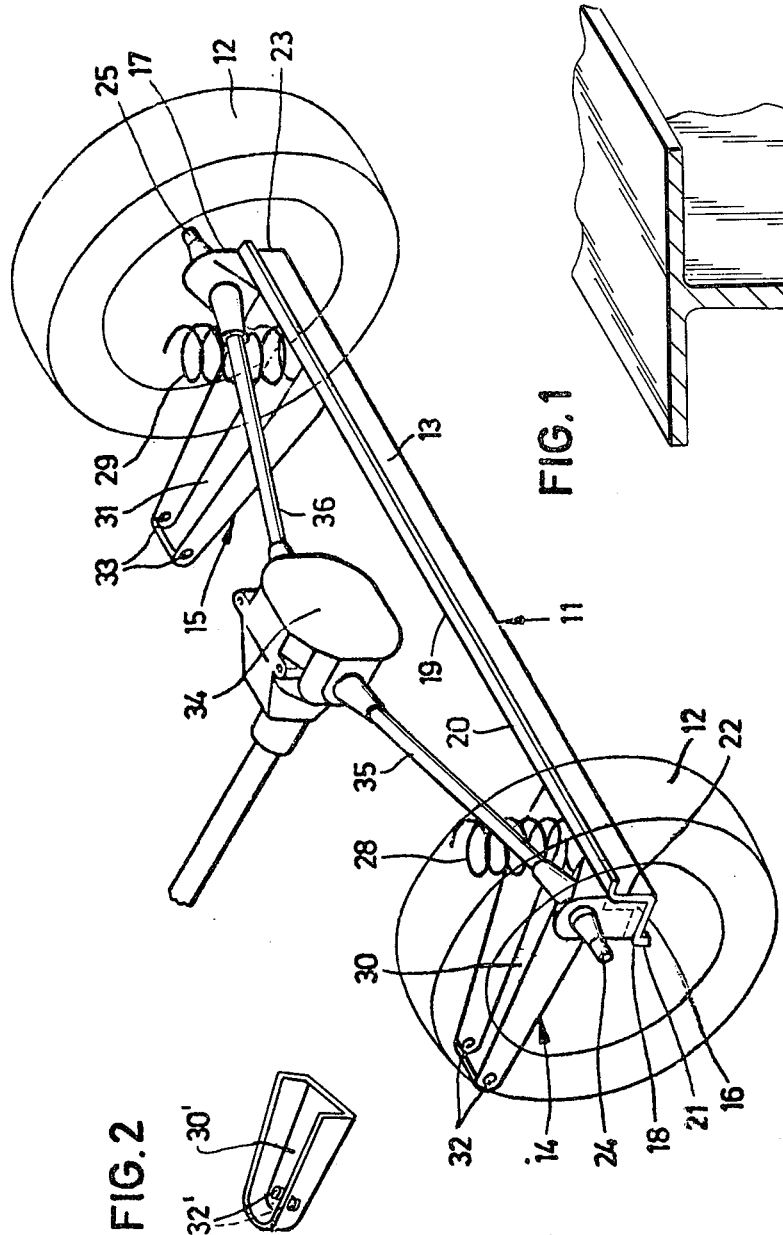
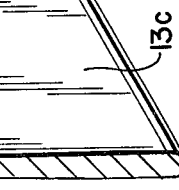
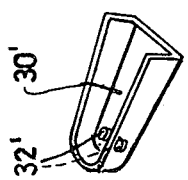
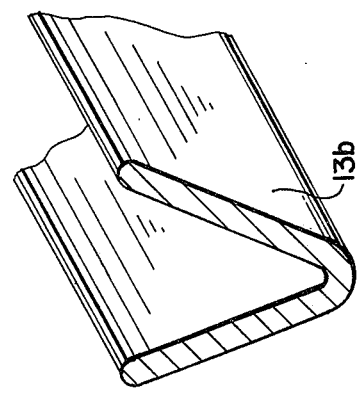

TORSION AXLE FOR MOTOR VEHICLES

This is a continuation of application Ser. No. 96,794, filed Dec. 10, 1970, now abandoned.

This invention relates to a torsion axle for vehicles, especially for motor vehicles, in which the transversely arranged axle element as well as the parallel longitudinal arms resistant to bending and attached to said element, have been developed to rotate elastically, attached carrier elements being provided in the area of the terminal cross sections of the transverse axle element.

It has already been known to use a split tube as a transversely lying axle element, whose ends are welded to carrier elements. The disadvantage of a split tube is that non-planar cross sections at the front sides of the tube, developing upon twisting, prevent welding the entire circumference of the tube ends to the carrier elements. Therefore, welding the carrier elements was limited to a relatively short peripheral edge on the rear portion of the tube opposite the slot. In this manner there was sufficient play of movement for the ends of the tube and the tensions at the places of welding were kept low. A disadvantage of such an arrangement is, however, that the torsionally elastic axle is limited to connection with the carrier elements only at a small sector of the tube.

The invention avoids the previously mentioned disadvantages. It is therefore an object of the invention to provide the transverse axle element connecting the longitudinal arms as a sectional steel member, the cross section of which being shaped to retain an at least approximately planar shape at the front sides of this sectional steel member upon twisting of the transverse axle element.

The advantage of this invention that carrier elements in the form of, for example, plates, can be welded to the transverse axle element in the area of its ends with the welding seam extending across the entire terminal cross section of the sectional steel member without concern that the tensions at the welds will increase considerably during torsion of the axle element. Furthermore, any curvatures at the terminal cross sections of the present transverse axle element will occur only to an insignificantly small degree.

According to the invention, the cross section of the sectional steel members of the transverse axle element is formed as L, T, V or other cross sectional shape and the longitudinal edges of these sectional steel members may be provided with flanges for the purpose of increasing their bending strength or resistance to bending.

According to a further object of the invention, the longitudinal arms may have a cross sectional shape corresponding to the cross sectional form similar to that of the transverse axle element. The longitudinal arms therefore may likewise have an L, V, T or other cross sectional shape. At the same time, however, they are not limited to the cross sectional shape of the transverse axle element and they can therefore according to the invention also have a cross section of a U-shape profile-like configuration.

Because of their characteristics of resistance to bending and of their rigid connections with the transverse axle element which is likewise resistant to bending to an elastically rotatable unit, an exact lateral guidance is provided; additional means for the support of the lateral forces (such as for example a hardened rod) are therefore dispensable.

A further object of the invention consists in that the longitudinal arms form supports in the area of their free ends and have recesses serving for the attachment of the car body, whereby said recesses can be made in an advantageous manner in a horizontal surface of the longitudinal arms constituting the support, and that at least two recesses for each longitudinal arm are available.

With the assistance of these attaching means an effective gripping of the longitudinal arms will be achieved, their torsion loads are kept low and the tensions in the transitional areas to the transverse axle element are reduced and even if the surface constituting the support is selected broad and the distance of the recesses from one another is large. Moreover, the attaching means according to the invention are advantageous during assembly.

Furthermore, according to the invention the longitudinal arms have a surface serving for the support of spring elements, and finally, the element axle part together with its longitudinal arms can be manufactured as a one-piece stamping.

An additional advantage of the rear wheel axle according to the invention is that its production and installation costs are lower than for the so-called elastically rotating crank axles heretofore known.

Further objects of the invention will be apparent from the following description when considered in connection with the accompanying drawing in which:

FIG. 1 is a perspective view of the entire rear wheel axle,

FIG. 2 is a perspective view of another attachment means to the car body, and

FIGS. 3A, 3B and 3C are, respectively, perspective views showing, in part, other shapes for the transverse axle element as L-shaped, V-shaped and T-shaped.

The torsion axle 11 consists essentially comprises a transverse axle part 13 connecting the wheels 12, longitudinal arms 14 and 15 and carrier elements 16 and 17. Transverse axle element 13 has been shaped from an L-shaped sectional steel member, whereby the longitudinal edges 18 and 19 have been provided with bent flanges 20 and 21. Also, transverse axle element 13 may be either L-shaped, V-shaped or T-shaped, as shown respectively in FIGS. 3A, 3B and 3C at 13a, 13b and 13c. Bent flanges 20 and 21 are provided along the longitudinal edges of each of the differently shaped transverse axle elements similarly as shown for the L-shaped transverse axle element in FIG. 1. At the free ends 22 and 23 of the transverse axle element 13, the carrier elements 16 and 17 have been welded on, which carry wheel pivots or stub axles 24 and 25.

The longitudinal arms 14 and 15 in the embodiment, given by way of example, have a U-shaped cross section, which however can also be shaped in some different manner. The U-shaped cross section of the longitudinal arms 14 and 15 is important in that a solid support of perpendicularly acting spring forces will be assured and furthermore, as shown in the embodiment given by way of example, the spring action elements 28 and 29 consist of spiral springs which are supported by surfaces 30 and 31 extending approximately perpendicularly to the direction of the spring action.

For an attachment of the torsion axle 11 to the car body (not shown), the longitudinal arms 14 and 15 have been provided with bores 32 and 33. As shown in FIG. 2, a support located in the area of the free end of the longitudinal arm 14 is formed by a flat section 30' in which bores 32' are located. The design of the mounting, as already mentioned, has particular advantages.

The torsion axle 11 according to the invention can be used for front and rear driven cars. A gear unit 34 may be attached to the car body and the wheels may be driven by means of double drive shafts 35 and 36.

I claim:

1. A torsional axle for vehicles, especially motor vehicles, comprising a straight, transversely disposed and rotationally elastic axle element, longitudinal parallel arms rigidly secured to said axle element and spaced a distance from one another, said arms being resistant to bending and being rotationally elastic, carrier elements having wheel pivots for the mounting of wheels thereon, said carrier elements each being welded to said axle element at its opposite cross-sectional end surfaces, said end surfaces each lying perpendicular to the longitudinal axis of said axle element, characterized in that said axle element has such a cross-sectional shape that each of said cross-sectional end surfaces always remain planar during the application of torsional stress on said axle element, whereby any tension stresses between said axle element and said carrier elements are substantially avoided.

2. A torsional axle for vehicles, especially motor vehicles, comprising a straight, transverse, torsionally elastic axle element, longitudinal parallel arms rigidly secured to said axle element and spaced a distance from one another, said arms being resistant to bending and being torsionally elastic, carrier elements having wheel pivots for the mounting of wheels thereon, said carrier elements each being welded to said axle element at its opposite cross-sectional end surfaces, said end surfaces each lying perpendicular to the longitudinal axis of said axle element, characterized in that said axle element has an L-shaped cross-section, so that each of said cross-sectional end surfaces always remain planar during the application of torsional stress on said axle element, whereby any tensional stresses between said axle element and said carrier elements are substantially avoided.

3. A torsional axle for vehicles, especially motor vehicles, comprising a straight, torsionally elastic axle element disposed crosswise, longitudinal parallel arms rigidly secured to said axle element and spaced a distance from one another, said arms being resistant to bending and being torsionally elastic, carrier elements having wheel pivots for the mounting of wheels thereon, said elements each being welded to said axle element at its opposite cross-sectional end surfaces, said end surfaces each lying perpendicular to the longitudinal axis of said axle element, characterized in that said axle element has a V-shaped section, so that each of said cross-sectional end surfaces always remain planar during the application of torsional stress on said axle element, whereby any tensional stresses between said axle element and said carrier elements are substantially avoided.

4. A torsional axle for vehicles, especially motor vehicles, comprising a straight, torsionally elastic axle element disposed crosswise, longitudinal parallel arms rigidly secured to said axle element and spaced a distance from one another, said arms being resistant to bending and being torsionally elastic, carrier elements having wheel pivots for the mounting of wheels thereon, said elements each being welded to said axle element at its opposite cross-sectional end surfaces, said end surfaces each lying perpendicular to the longitudinal axis of said axle element, characterized in that said axle element has a T-shaped section, so that each of said cross-sectional end surfaces always remain planar during the application of torsional stress on said axle element, whereby any tensional stresses between said axle element and said carrier elements are substantially avoided.

* * * * *